United States Patent [19]

Popper

[11] 4,328,944
[45] May 11, 1982

[54] LOAD SUPPORTING DEVICE

[75] Inventor: Jakhin B. Popper, Kiryat Motzkin, Israel

[73] Assignee: Popper Engineering Ltd., Motzkin, Israel

[21] Appl. No.: 41,189

[22] Filed: May 21, 1979

[30] Foreign Application Priority Data

May 23, 1978 [IL] Israel .................................... 54767
Jan. 4, 1979 [IL] Israel .................................... 56372

[51] Int. Cl.³ ............................................ F16M 13/00
[52] U.S. Cl. .................................... 248/593; 248/571
[58] Field of Search ................ 248/571, 592; 267/165, 267/158

[56] References Cited

U.S. PATENT DOCUMENTS

| 916,518 | 3/1909 | Wurts | 248/571 X |
| 2,969,972 | 1/1961 | Holmen | 248/571 X |
| 2,974,914 | 3/1961 | Sherburne | 248/571 |
| 2,989,276 | 6/1961 | Debbage | 248/571 |
| 3,048,359 | 8/1962 | Kohler | 248/571 X |
| 3,718,305 | 2/1973 | Suozzo | 248/571 |

FOREIGN PATENT DOCUMENTS

| 725037 | 1/1966 | Canada | 248/571 |
| 969010 | 12/1950 | France | 267/158 |
| 472251 | 9/1937 | United Kingdom | 267/165 |
| 543423 | 2/1942 | United Kingdom | 267/165 |

Primary Examiner—J. Franklin Foss
Attorney, Agent, or Firm—Browdy and Neimark

[57] ABSTRACT

A deflecting load supporting apparatus comprising a base; a load receiving lever element pivotably mounted onto said base; at least one buckling element disposed in engagement with said base and said load receiving lever element so as to undergo a predetermined buckling displacement under at least a predetermined load.

9 Claims, 20 Drawing Figures

LOAD SUPPORTING DEVICE

The present invention relates to load supports and more particularly to load supports employing springs and displaying a low spring rate, i.e. a low ratio of additional force to additional displacement, and thus suitable for support of elements which undergo thermal or other displacements.

Low rate force exerting devices are also required as machine elements in many mechanical applications such as belt tighteners.

Spring load supports are currently employed in a large variety of applications. One particular application is in the support of piping in oil refineries, atomic power installations and similar installations where thermal effects, produced, for example, by a heated fluid passing through the piping cause not insignificant displacement thereof. In these applications it is normally required that the load supports must hold a load F under a displacement d without considerably increasing F.

Coil springs are widely used as load supports in the above applications but suffer from significant disadvantages arising out of their relatively large required size, weight and cost. Due to the large weight, substantial structural support must be provided for the coil springs and this involves additional costs. The q value of a coil spring suitable for use as a load support is in the range of $1/300$ kg/mm$^2$.

Leaf springs may also be employed as load supports, in a cantilever arrangement. Their q value, taking into account their permissible bending stress of 64 kg/mm$^2$ is in the range of $1/4500$ kg/mm$^2$.

Since the weight of the spring can be calculated by the equation:

$$W = \tfrac{1}{2} dF\gamma/q \tag{1}$$

where $\gamma$ is the specific weight of the spring material
d is the required maximum displacement
F is the load it can be appreciated that the smaller q is, the heavier and more expensive will be the entire suspension system since q is the storable energy in a volume unit of spring material of the system.

Spring suspension apparatus has also been developed and is presently used employing a plurality of levers associated with linear positive rate, as opposed to soft, springs, and providing a substantially constant force within a predetermined range of displacements. Apparatus of this type incorporates a large number of moving parts and is relatively complicated and expensive. It also requires an accurately predetermined spring rate and often does not display a high degree of reliability.

The present invention seeks to provide force exerting apparatus which avoids the disadvantages of helical and other springs in terms of weight and cost and also overcomes the disadvantages of prior art spring suspension apparatus arising from the complexity of their construction.

There is thus provided in accordance with an embodiment of the present invention load supporting apparatus comprising a fixed base, a support element pivotably mounted onto the fixed base and arranged for supporting a load and at least one buckling element disposed in engagement with the base for undergoing a buckling displacement in response to the load.

The invention will be more fully understood and appreciated from the following detailed description taken in conjunction with the drawings in which.

Figure 1:
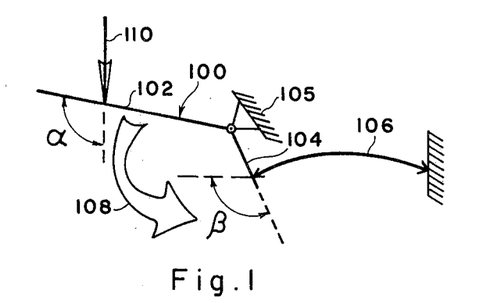
FIG. 1 is a schematic illustration of a load supporting device constructed and operative in accordance with an embodiment of the present invention.

Referring now to FIG. 1 there is seen a schematic diagram of a force exerting device constructed and operative in accordance with an embodiment of the present invention. A lever 100, comprising a relatively long force receiving arm 102 and a relatively short spring engaging arm 104 is pivotably mounted on a fixed base. A leaf spring 106 is arranged between the fixed base 105 and the end of force receiving arm 102 so as to receive a compressive buckling force when the lever 100 is rotated about its pivot in a direction indicated generally by arrow 108 in response to the application of a force F' in a direction generally indicated by an arrow 110 at the extreme end of arm 102.

It is a particular feature of the present invention that when the device is loaded by F' which is less than a predetermined level F, the load supporting device behaves as if it were rigid. Once the load increases above F deflection of leaf spring 106 begins.

The force F at which deflection of the leaf spring begins is calculated as follows:

$$F = K/n \qquad (2)$$

where n is the ratio of the lengths of the lever arms from the pivot, i.e. (lever arm 102)/(lever arm 104) and K is the buckling force according to Euler $$K = \pi^2 EI/L^2 \qquad (3)$$

where
I is the moment of inertia of the section of the leaf spring undergoing buckling;
L is the length of the leaf spring; and
E is the elastic module In contrast to what would be expected, loading of the device with a force F' which exceeds F does not cause a total yield of the spring but results in a relatively small deflection $$d = n \cdot \Delta \qquad (4)$$

where $$\Delta = \frac{L}{4} \frac{1}{1 + \left(\frac{\pi Eh}{SL}\right)^2} \qquad (5)$$

and S is the permissable stress and h is the thickness of the leaf spring it is also $$\Delta = L \frac{\epsilon}{1 + \epsilon} \qquad (6)$$

where ε is the percentual increase in the force F' above the limit F

The q value for the device is given by $$q_b = \frac{S^2}{24 E (1 + \epsilon)} \qquad (7)$$

if one takes
S to be equal to 64 kg/mm² (permissable bending stress)
E to be equal to 20,000 kg/mm² and requires that ε be equal to 0.02 (permitting a 2% force increase)

$$q_b = \frac{1}{120} \qquad (8)$$

This value is seven times larger than the q value for the coil spring and about 40 times larger than the q value for a leaf spring, and indicates how much less spring material is required in a load supporting device constructed and operative in accordance with an embodiment of the present invention as compared with prior art devices.

A variety of examples of practical embodiments of load support devices will now be described. It should be noted that reference to buckling elements in this specification and the claims is intended to include rods or leaf springs of any width and material such as steel, brass or e.g. reinforced plastics, especially the newly developed Aramit Epoxy with an extremely high q value (about q=0.1). The width may vary from a narrow width characteristic of conventional ribbon-like leaf springs and may extend to a sheet whose width is as great or greater than its length.

Figure 2:
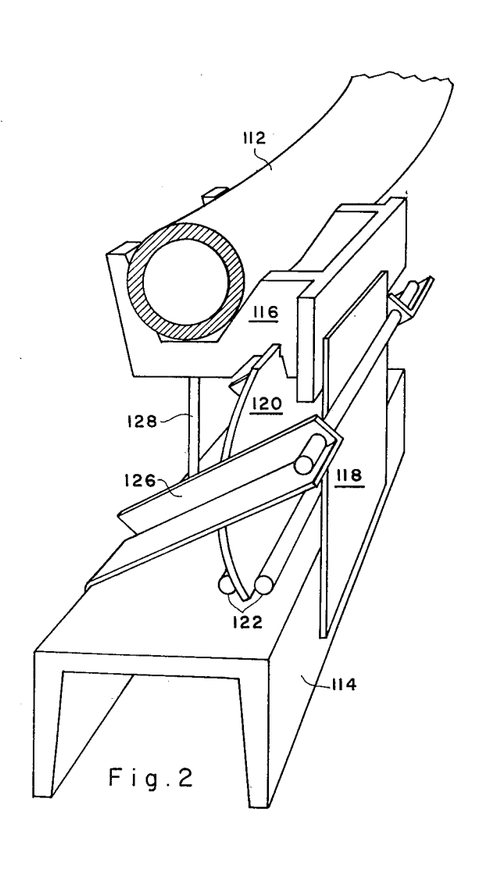
FIG. 2 is a schematic illustration of a load supporting device constructed and operative in accordance with another embodiment of the present invention.

Referring now to FIG. 2 there is shown a load supporting member adapted for supporting a pipe 112 and comprising a fixed base which may be mounted on a wall or floor, indicated by reference numeral 114, a load receiving member 116 and a joining member 118, such as a plate of sheet metal which joins member 116 to base 114 while permitting by bending the pivotal motion of the receiving member relative to the base within a limited range. A leaf spring 120 is disposed between mounting rods 122 fixed to base 114 and a mounting notch formed in load receiving member 116 at a location closer to the pivot point than the load. Side bars 126 are provided to prevent lateral displacement of the leaf spring and a bar 128 is provided to prevent overdeflection of the load receiving member which could cause failure of the device. Bar 128 may also comprise a gauge for indicating deflection of the device. The diagonal 126 is to prevent the mechanism from deflecting sideways.

It is noted with respect to the example illustrated hereinabove and to the various other examples illustrated in the specification that the load supporting devices of the present invention are designed to have a Δ which is small in relation to L. Thus, in accordance with equation (4) above, it is necessary to have n, i.e. the ratio between the length of the load receiving arm and the spring mounting arm, greater than one.

Figure 3:
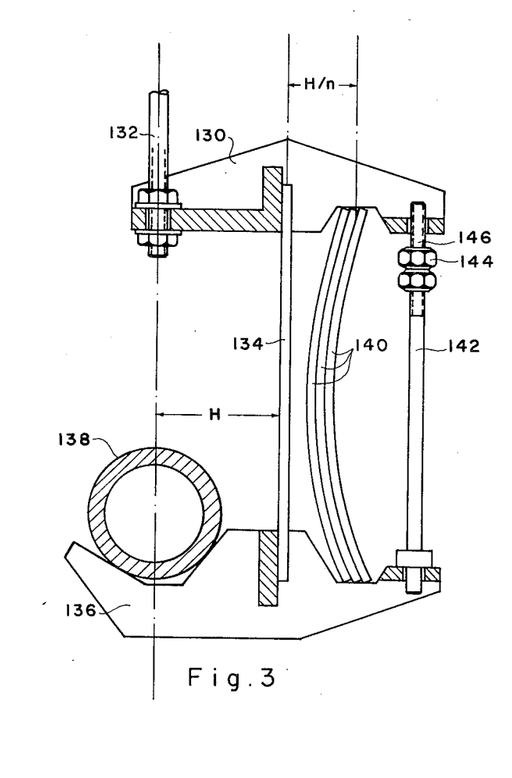
FIG. 3 is a schematic sectional illustration of a load supporting device constructed and operative in accordance with still another embodiment of the present invention and employing a plurality of leaf springs.

Reference is now made to FIG. 3 which shows a flexible tube hanger comprising a base 130 which may be hung via a support rod 132 from a ceiling. Attached below base 130 by means of a central pivot plate 134 is a load supporting lever member 136. A load, typically a tube 138 is disposed at one side of plate 134, typically at a distance H from the plate, while a plurality of wide leaf springs 140 are disposed at a distance H/n, where n is greater than one, at the opposite side of the load supporting lever member 136. A restraining bar 142 having a nut 144 movable to a selectable stop position on a threaded portion 146 thereof, serves to guard against overdeflection and may serve as a deflection gauge.

It is noted that in the embodiment of FIG. 3, a certain amount of relative motion occurs in the leaf springs and between the load supporting lever member 136 and the base 130 in a transverse direction. This relative motion may be avoided by a construction illustrated in FIG. 5. Here, a base 150, which may be apertured for ceiling mounting, is attached to a load supporting lever member 152 by a pair of pivot rods 154 which straddle the tube 156 being supported. The lever member 152 is constructed with a single upstanding support surface 158 arranged to one side of the pivot rods 154. At the other side of the pivot rods are disposed a pair of leaf spring groups 160, on opposite sides of the tube and at a distance from the pivot rods which is less than the distance between the pivot rods and support surface 158.

Figure 5:
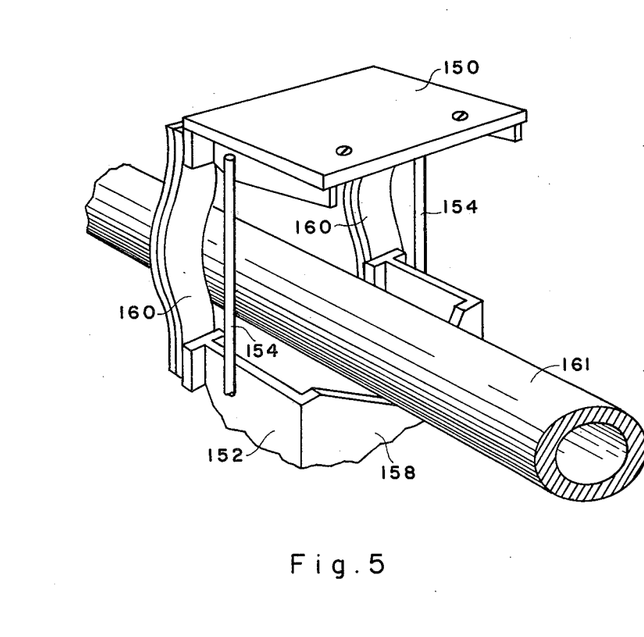
FIG. 5 is a schematic illustration of a load supporting device in which deflection of the leaf springs takes place along the axis of a pipe supported thereby.

The construction of FIG. 5 has the advantage that friction between the lever member 152 and the tube 161 supported thereby as the result of relative movement therebetween during deflection of the support is reduced by arranging the axis of rotation of the leaf springs 160 to be perpendicular to the tube axis. This reduces hysteresis in deflection which may be unacceptable in certain applications.

If relative motion between the ends of the leaf springs 160 and the base and the lever member 152 must be eliminated, the ends of the leaf springs may be rigidly connected to the base and lever member. Thinner leaf springs are required in such an application, however.

Figure 4:
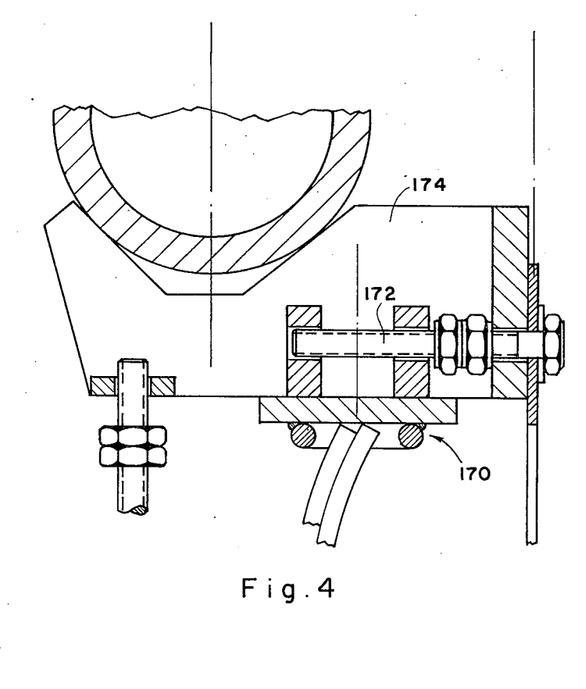
FIG. 4 is a schematic illustration of a portion of a load supporting device having an adjustably positionable mounting for the leaf springs.

Reference is now made to FIG. 4 which illustrates a leaf spring mounting arrangement which permits the force limit F at which buckling of the leaf spring occurs to be varied by varying the ratio of the lever arms n in accordance with equation (2) hereinabove. As seen in FIG. 4, an adjustably positionable mounting member 170 is screw mounted by means of a screw 172 onto a load supporting lever element 174. A similar movable arrangement may or may not be provided on the base of the device which is not shown in the drawing, and is not required.

Figure 6:
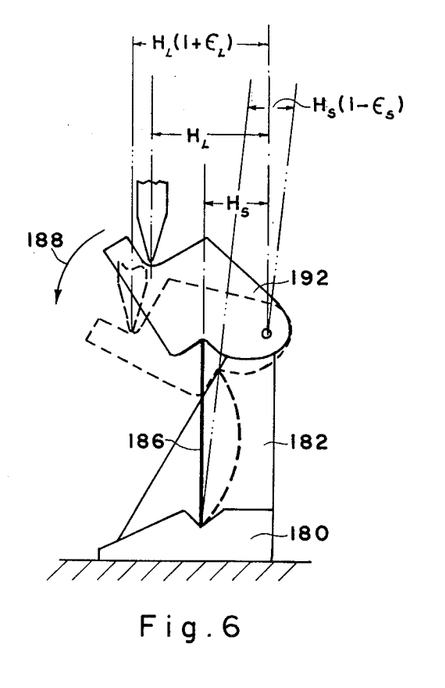
FIGS. 6 and 7 illustrate load supporting devices which are arranged such that a change in the load changes both the load and the spring lever arms.
Figure 7:
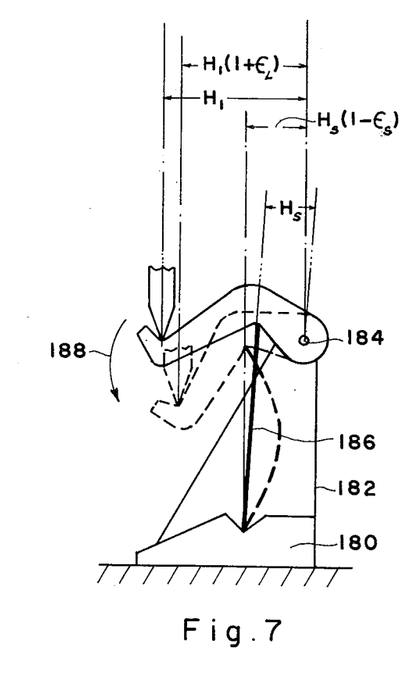

Reference is now made to FIGS. 6 and 7 which show load supporting devices having a predetermined selectable spring rate. Both of the illustrated devices comprise a base 180, a generally upstanding support portion 182 defining a pivot axis 184, a load receiving lever member 192 pivotably mounted about axis 184 and a leaf spring 186 mounted between base 180 and a notch located along an underside surface of the load receiving lever member. In both illustrations the load receiving lever member is configured and mounted such that during deflection in a direction indicated generally by an arrow 188, the effective distance between the mounting notch and the pivot and between the load and the pivot and between the load and the pivot changes.

In the example of FIG. 6 the deflection produces an increase in the load distance to the pivot $H_L$ and a decrease in the spring distance to the pivot $H_S$. In the example of FIG. 7, the load receiving lever 192 is constructed such that the deflection along arrow 188 produces a decrease in $H_L$ and an increase in $H_S$. It may be appreciated that the arrangement of FIG. 7 any suitable required value of spring rate of the device can be achieved:

if $\epsilon_L$ is the percentage change in load-pivot axis distance and $\epsilon_s$ is the percentage change in spring-pivot axis distance and $\epsilon$ is the percentage increase in the force of spring due to buckling there are three constructural possibilities:

then if $\epsilon = \epsilon_L + \epsilon_s$ the load support has a zero rate (e.g. FIG. 6)

if $\epsilon > \epsilon_L + \epsilon_s$ the load support has a positive rate as in FIG. 7 and if $\epsilon < \epsilon_L + \epsilon_s$ the load support has a negative rate (e.g. FIG. 6). If, as illustrated in the embodiments of FIGS. 6 and 7, $\epsilon_L$ and/or $\epsilon_s$ can be made negative hence any required value for the spring rate of the load supporting devices can be obtained.

The same technique may be illustrated by FIG. 1: namely by increasing the angles $\alpha$ and/or $\beta$ the apparent spring rate of the device is decreased and vice versa.

Figure 8A:
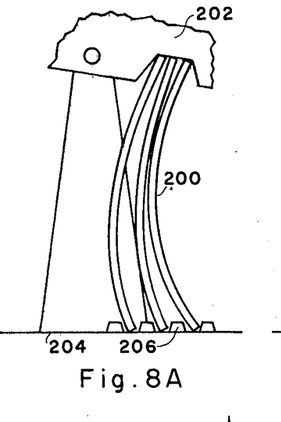
FIGS. 8A, 8B and 8C illustrate three alternative arrangements of leaf springs in apparatus constructed and operative in accordance with an embodiment of the invention.
Figure 8B:
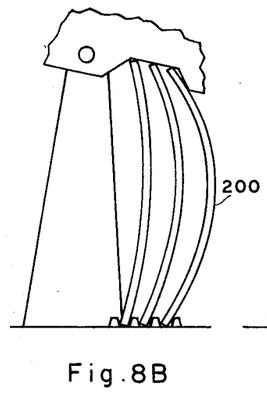
Figure 8C:
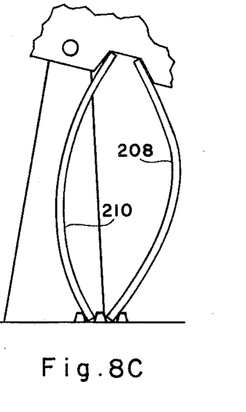

Reference is now made to FIGS. 8A, 8B and 8C which illustrate a variety of buckling spring arrangements for use in a load supporting device in accordance with an embodiment of the invention. FIG. 8A shows where a total of three leaf springs 200 is used and the leaf springs are bunched together at the load supporting lever 202 but spread apart somewhat at a base 204 by separating protrusions 206. This arrangement has two beneficial features. The first is that the springs are arranged to flex towards the pivot, such that a relatively low turning motion between the lever 202 and the springs 200 is produced. Secondly, the spreading apart of the springs serves to prevent interference therebetween during flexion. This spreading apart of the leaves may of course be done at both or either of their ends.

FIG. 8B shows an arrangement where the leaf springs 200 flex away from the pivot. A relatively high internal friction loss is encountered but substantially no rubbing friction between the springs since they flex away from each other.

FIG. 8C shows an arrangement wherein a pair of leaf springs 208 and 210 are arranged to flex in relative opposite directions away from each other.

Figure 9A:
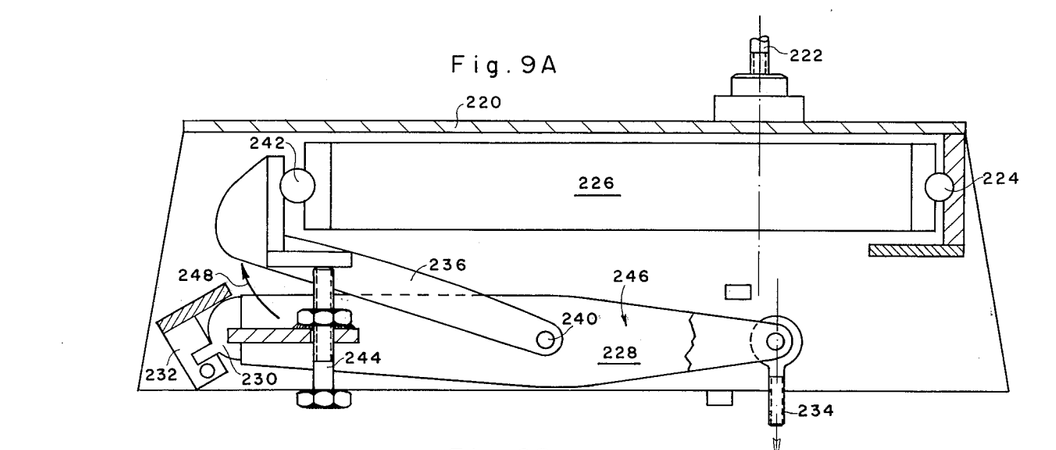
FIGS. 9A and 9B are respective side and bottom views of a compact load supporting device constructed and operative in accordance with an embodiment of the present invention.
Figure 9B:
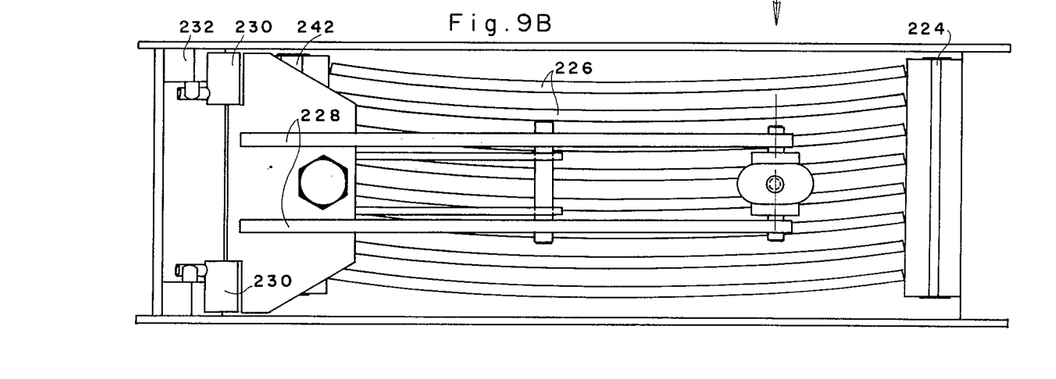

Reference is now made to FIGS. 9A and 9B which are respective side and bottom views of a load supporting device constructed and operative in accordance with an alternative embodiment of the present invention. Here a base 220 is supported as by a cable 222 or threaded rod from a ceiling and supports by means of a suitable mounting, such as a horizontally disposed rod 224, a plurality of leaf springs 226 arranged, as shown in a generally horizontal plane extending generally perpendicular to the surfaces of the springs.

A load receiving lever element 228 is pivotably mounted by means of a pin 230 which rollably engages a socket 232 fixed onto base 220, receives a load from a cable 234 which is weighted in a downward direction. An intermediate lever member 236 is pivotably mounted onto load receiving lever element 228 at an axis 240 defined in the element 228 and engages, via a mounting rod 242 the opposite ends of leaf springs 226. Cables 222 and 234 are laterally offset from each other for balancing the weight of the load support.

A screw 244 which is selectably positionable relative to lever element 228 and threadably mounted thereon defines a fulcrum for intermediate lever member 236, such that deflection of element 228 about its pivot in a direction indicated generally by an arrow 246 produces motion of intermediate lever member 236 about its fulcrum in a direction indicated generally by an arrow 248 so as to produce a change in the lever arm of the leaf springs 226, and a consequent adjustment of the force F.

The arrangement illustrated in FIGS. 9A and 9B has the advantages of compact design and relatively high load capacities.

Figures 10, 11, 13:
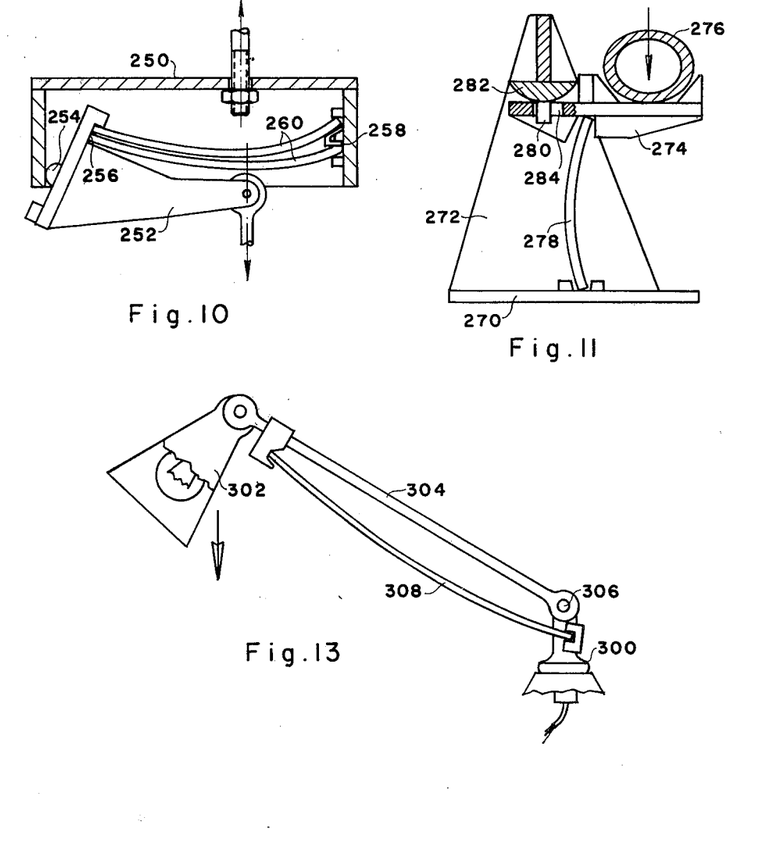
FIG. 10 is a schematic side view illustration of compact load supporting apparatus constructed and operative in accordance with an alternative embodiment of the invention.
FIG. 11 is a schematic side view illustration of load supporting apparatus employing a pivot that permits lateral slippage.
FIG. 13 is a schematic illustration of a lamp employing load supporting apparatus constructed and operative in accordance with an embodiment of the present invention.

FIG. 10 shows another relatively compact load support device comprising a cable mounted base 250 onto which is pivoted a load receiving lever member 252 at an axis 254. Disposed between a mounting socket 256 formed on lever 252 and a mounting location 258 on base 250 are a pair of leaf springs 260 which are spread apart at their mounting location 258 opposite their connection to the lever 252 so as to prevent interference therebetween during flexion.

FIG. 11 illustrates another embodiment of load support comprising a base 270 and a couple of upstanding members 272. A load receiving lever 274 supporting a tube 276 is pivoted on a leaf spring 278. A counterbalancing force is provided by a selectably positionable pin member 280 having disposed thereabout a rounded contact surface 282 Pin member 280 engages a socket 284 formed in lever 274 and which is larger than the diameter of the pin so as to permit the lever to roll relative therethrough so as to prevent undesirable levels of hysteresis under deflection.

Figure 12:
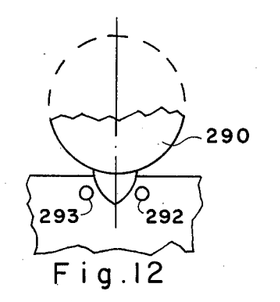
FIG. 12 is a detailed schematic illustration of a pivot suitable for use in load supporting apparatus of the present invention.

FIG. 12 illustrates a detail of a pivot mounting, such as that employed in the embodiment of FIGS. 9A and 9B, 11 and 15A, 15B and 16. It comprises a ball or cylinder 290 having a protrusion 292 which engages a hole 293 or any other suitable socket to assure the proper relative positioning. The loose pivot mechanism can be used due to the practically small angles of rotation that are encountered.

FIG. 13 shows a lamp constructed and operative in accordance with the principles taught herein and comprising a base 300, a lamp head 302 providing the load, a load receiving lever 304 mounted at an axis 306 on the base 300 and a leaf spring 308 disposed between a mounting socket fixed to the base 300 and a second mounting socket mounted at a location partway from the pivot axis 306 along load receiving lever 304. It is seen that increasing the load, increases the buckling of spring 308.

Figure 14:
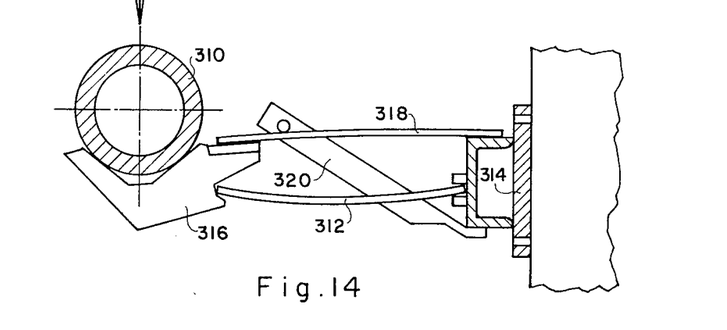
FIG. 14 is a schematic illustration of load supporting apparatus constructed and operative in accordance with an embodiment of the invention and arranged to receive a loading force in a direction perpendicular to the buckling element.

FIG. 14 shows a load supporting device in which the load, typically a pipe 310 is applied in a direction perpendicular to the surface of a leaf spring 312 which extends between a base 314 and a load receiving element 316, attached to base by a lever arm 318. A side bar 320 is provided to prevent transverse bending or other movement of the bending pivot arm 318 and spring 312.

Figure 15A:
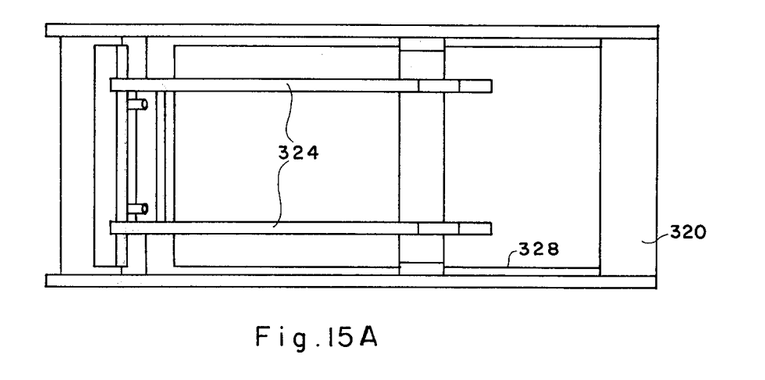
FIGS. 15A and 15B are respective top and side view schematic illustrations a load supporting device constructed and operative in accordance with another embodiment of the present invention.
Figure 15B:
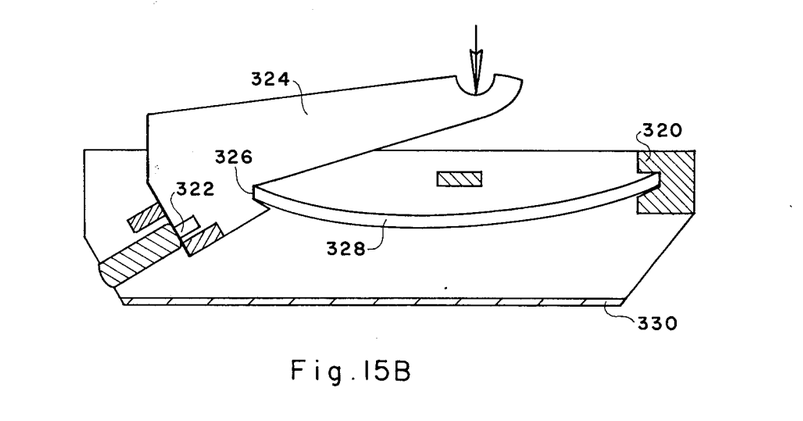

FIGS. 15A and 15B show a load supporting device comprising a base 320 which defines a low friction, low hysteresis pivot 322. Mounted on pivot 322 is a load receiving lever 324 which defines a spring mounting notch 326. A leaf spring 328 is disposed between notch 326 and a corresponding mounting socket 330 formed in base 320. This is another example of an arrangement where the load is applied in a direction perpendicular to the surface of the leaf spring, and it acts in lieu of a compression spring arrangement compared to e.g. FIG. 16 which comprises a spring in tension.

Figure 16:
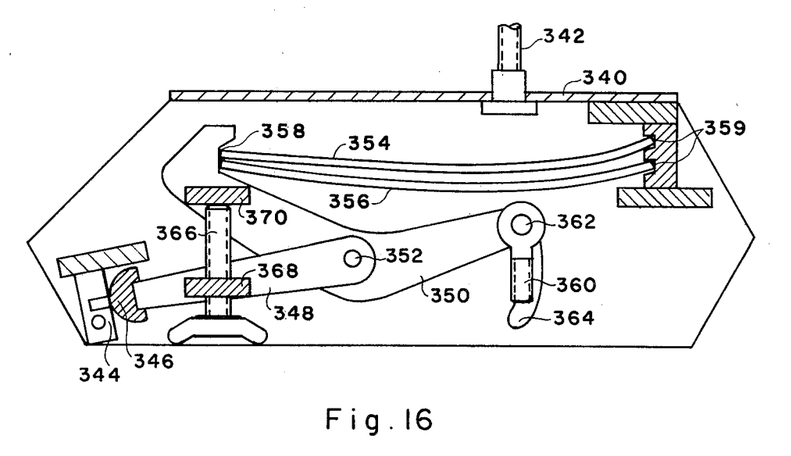
FIG. 16 is a schematic side view illustration of an adjustable load supporting device constructed and operative in accordance with an embodiment of the invention.

Reference is now made to FIG. 16 which illustrates a load supporting device constructed and operative in accordance with still another embodiment of the present invention. A base 340 is suspended as from a ceiling by a cable 342. A low friction pivot socket 344 fixed onto base 340 is engaged by a rounded, low friction pivot pin 346 formed at one end of a first lever member 348. The opposite end of the first lever member 348 is pivotably mounted onto a load receiving lever 350 at a pivot axis 352 fixed on lever 350. A pair of leaf springs 354 and 356 are disposed between a mounting notch 358 formed on load receiving lever 350 and a mounting assembly 359 fixed to base 340. A load is applied to lever 350 as by a cable 360 attached to an end 362 of the lever opposite the mounting notch 358. The displacement of end 362 relative to the base 340 is limited as by a cam slot 364 formed in base 340 and engaged by a projection (not shown) fixed to end 362 of lever 350. Alternatively another suitable type of displacement stop may be used.

The orientation of lever 350 and the compression of springs 354 and 356 is determined by the position of a screw 366 which is threaded into a socket 368 fixed to the first lever member 348 and whose extreme end engages and supports a stop 370 fixed to lever 350.

It is a particular feature of the present invention that notwithstanding adjustment of the spring force by changing the position of screw 366, the position h at which displacement in a downward direction of lever end 362 begins under load conditions remains fixed due to the fact that lever 352 is mounted pivotably on pivot mounted first lever member 348.

The present invention is not limited to what has been shown and described specifically hereinabove. Rather the scope of the invention is defined only by the claims which follow:

I claim:

1. A deflecting load supporting apparatus comprising:
   a base;
   a load receiving lever element pivotably mounted onto said base;
   at least one buckling element disposed in engagement with said base and said load receiving lever element so as to undergo a predetermined buckling displacement under at least a predetermined load; and
   an intermediate lever member pivotably mounted on said lever element for interconnecting said lever element and said at least one spring.

2. Load supporting apparatus according to claim 1 and wherein said intermediate lever member pivots about a fulcrum defined with respect to said lever element.

3. Load supporting apparatus according to claim 2 and wherein said fulcrum is selectably defined by a screw movably threadably engaging said lever element.

4. Load supporting apparatus comprising:
   a base;
   a load receiving lever element pivotably mounted onto said base;
   at least one buckling element disposed in engagement with said base and said load receiving lever element so as to undergo a predetermined buckling displacement under at least a predetermined load;
   and wherein said at least one buckling element is arranged for rotational motion together with said load receiving lever element about a pivot spaced from the pivot of said lever element.

5. Load supporting apparatus comprising:
   a base;
   a load receiving lever element pivotably mounted onto said base;
   at least one buckling element disposed in engagement with said base and said load receiving lever element so as to undergo a predetermined buckling displacement under at least a predetermined load;
   and wherein said load receiving lever element is pivotably mounted onto an intermediate lever which is in turn pivotably mounted onto said base.

6. Load supporting apparatus according to claim 5 and wherein the angular displacement between said intermediate lever and said load receiving element under no load conditions is determined selectably and adjustably by screw means.

7. Load supporting apparatus according to claim 5 and wherein the displacement of said load receiving lever relative to said base under load conditions is limited by stop means.

8. Load supporting apparatus according to claim 7 wherein said stop means comprises a cam path.

9. Load supporting apparatus according to claim 5 and wherein said intermediate lever and said load receiving lever element are arranged such that the displacement range of said load receiving lever between said stop means remains unchanged despite adjustment of said screw means for determining the initial spring force conditions.

* * * * *